United States Patent [19]

Arakawa et al.

[11] Patent Number: 4,574,102

[45] Date of Patent: Mar. 4, 1986

[54] RADIATION IMAGE STORAGE PANEL

[75] Inventors: Satoshi Arakawa; Terumi Matsuda, both of Kaisei; Akio Ishizuka, Fujinomiya; Yoshihiko Shibahara, Minami-ashigara, all of Japan

[73] Assignee: Fuji Photo Film Company, Ltd., Kanagawa, Japan

[21] Appl. No.: 617,021

[22] Filed: Jun. 4, 1984

[30] Foreign Application Priority Data

Jun. 3, 1983 [JP] Japan ................................ 58-99237

[51] Int. Cl.[4] ........................ B32B 7/00; B32B 19/02; B32B 19/04

[52] U.S. Cl. ................................ 428/212; 250/327.2; 250/483.1; 428/332; 428/690

[58] Field of Search ....................... 428/690, 332, 212; 250/363 R, 486.1, 483.1, 327.2, 337; 564/312

[56] References Cited

U.S. PATENT DOCUMENTS

| | | | |
|---|---|---|---|
| 3,859,527 | 1/1975 | Luckey | 250/337 X |
| 4,236,078 | 11/1980 | Kotera et al. | 250/363 R |
| 4,239,968 | 12/1980 | Kotera et al. | 250/337 X |
| 4,326,078 | 4/1982 | Herrmann | 564/312 |
| 4,486,486 | 12/1984 | Maeoka et al. | 428/690 X |
| 4,508,636 | 4/1985 | Ochiai | 428/690 X |

*Primary Examiner*—Thomas J. Herbert

*Attorney, Agent, or Firm*—Murray, Whisenhunt & Ferguson

[57] ABSTRACT

A radiation image storage panel comprising a support, a phosphor layer provided on the support which comprises a binder and a stimulable phosphor dispersed therein, and a protective film provided on the phosphor layer, characterized in that a mixing ratio of the binder to the stimulable phosphor in said phosphor layer so varies as to show a minimum value within a region of depth of from 1/5 to 4/5 of the thickness of the phosphor layer, the depth being expressed in terms of relative distance from the protective film-side surface.

6 Claims, 2 Drawing Figures

RADIATION IMAGE STORAGE PANEL

BACKGROUND OF THE INVENTION

1. Field of the Invention

This invention relates to a radiation image storage panel and more particularly to a radiation image storage panel comprising a support, a phosphor layer which comprise a binder and a stimulable phosphor dispersed therein, and a protective film, superposed in this order.

2. Description of the Prior Art

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968 has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; exciting the stimulable phosphor with an electromagnetic wave such as visible light and infrared rays (hereinafter referred to as "stimulating rays") to sequentially release the radiation energy stored in the stimulable phosphor as light emission (stimulated emission); photoelectrically detecting the emitted light to obtain electric signals; and reproducing a radiation image as a visible image from the electric signals. In the above-described radiation image recording and reproducing method, a radiation image can be obtained with a sufficient amount of information by applying a radiation to the object at considerably smaller dose, as compared with the case of utilizing the conventional radiography. Accordingly, this radiation image recording and reproducing method is of great value especially when the method is used for medical diagnosis.

The radiation image storage panel employed in the above-described radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (i.e., stimulated emission) when exposed to an electromagnetic wave such as visible light or infrared rays after having been exposed to a radiation such as X-rays. In the radiation image recording and reproducing method, the radiation having passed through an object or having radiated from an object is absorbed by the phosphor layer of the radiation image storage panel in proportion to the applied radiation dose, and a radiation image of the object is recorded on the radiation image storage panel in the form of a radiation energy-stored image. The radiation energy-stored image can be released as stimulated emission by irradiating the panel with an electromagnetic wave such as visible light or infrared rays (i.e., stimulating rays). The stimulated emission is then photoelectrically detected to obtain electric signals, so as to reproduce a visible image from the electric signals.

It is required that the radiation image storage panel has a sufficient mechanical strength so as not to allow easy separation of the phosphor layer from the support as well as from the protective film, when the panel receives mechanical shocks and mechanical force in the course of possible falling or bending thereof. Further, since the radiation image storage panel hardly deteriorates upon exposure to a radiation or to an electromagnetic wave ranging from visible light to infrared rays, the panel can be empolyed repeatedly for a long period of time. Accordingly, it is necessary for the panel in the repeated use not to cause such troubles as the separation between the phosphor layer and the support and the separation between the phosphor layer and the protective film caused by mechanical shocks applied in the handling of the panel in a procedure of exposure to a radiation, in a procedure of reproducing a radiation image brought about by excitation with an electromagnetic wave after the exposure to the radiation, or in a procedure of erasure of the radiation image information remaining in the panel.

However, the radiation image storage panel has a tendency that the bonding strength between the support and the phosphor layer or the bonding strength between the protective film and the phosphor layer decreases as the mixing ratio of the binder to the stimulable phosphor (binder/stimulable phosphor) in the phosphor layer in contact with the support or protective film decreases, in other words, as the amount of the stimulable phosphor contained therein increases.

On the other hand, the radiation image storage panel generally provides an image of decreased sharpness, as the mixing ratio of the binder to the stimulable phosphor in the phosphor layer of the panel increases, in other words, as the amount of the stimulable phosphor contained in the phosphor layer decreases.

For these reasons, it is difficult to adjust the mixing ratio of the binder to the phosphor in the phosphor layer so as to satisfy not only the bonding strength between the support and the phosphor layer as well as that between the protective film and the phosphor layer, but also the sharpness of the image provided by the panel. As for the conventional radiation image storage panel having a single phosphor layer, there is hardly obtained a panel capable of providing an image of high quality as well as showing a sufficient bonding strength between the support and the phosphor layer and that between the protective film and the phosphor layer.

SUMMARY OF THE INVENTION

It is an object of the present invention to provide a radiation image storage panel having the characteristics to give an image of high sharpness as well as a high mechanical strength, especially a high bonding strength between the phosphor layer and the support and a high bonding strength between the phosphor layer and the protective film.

The object is accomplished by the radiation image storage panel comprising a support, a phosphor layer provided on the support which cmprises a binder and a stimulable phosphor dispersed therein, and a protective film provided on the phosphor layer, characterized in that a mixing ratio of the binder to the stimulable phosphor in said phosphor layer so varies as to show a minimum value within a region of depth of from 1/5 to 4/5 of the thickness of the phosphor layer, the depth being expressed in terms of relative distance from the protective film-side surface.

In the present invention, the mixing ratio of the binder to the stimulable phosphor in the phosphor layer means a mixing ratio by weight represented by "amount of binder/amount of stimulable phosphor".

DETAILED DESCRIPTION OF THE INVENTION

Figure 1:
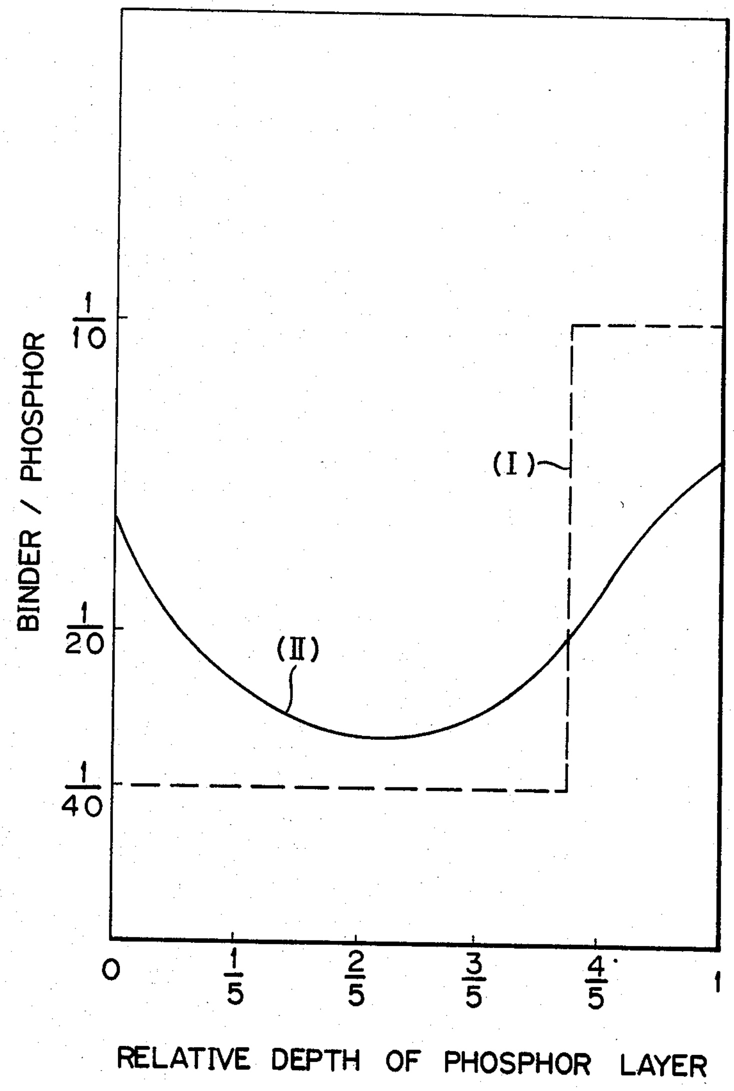
FIG. 1 shows relationships between the relative depth of the phosphor layer from the protective film-side surface and the mixing ratio of the binder to the phosphor (binder/phosphor) in the radiation image storate panel according to the present invention, in which Curve (I) shows the relationship given immediately after applying the coating dispersion for the phosphor layer to the support and Curve (II) shows the relationship given after drying the applied the coating dispersion.

The radiation image storage panel of the present invention is enhanced in both the sharpness of an image provided thereby and the bonding strength between the support and phosphor layer as well as between the protective film and the phosphor layer, by making the mixing ratio of the binder to the stimulable phosphor inside of the phosphor layer smaller than the mixing ratio in the vicinity of the interface between the protective film and the phosphor layer (i.e., in the region of not less than 1/10 of the thickness of the phosphor layer from said interface), and smaller than the mixing ratio in the vicinity of the interface between the support and the phosphor layer (i.e., in the region of not less than 1/10 of the thickness of the phosphor layer from said interface), that is, by adjusting the distribution of the binder and the phosphor in such a manner that a larger amount of the phosphor presents sufficiently inside of the phosphor layer and a larger amount of the binder presents in the vicinity of both interfaces thereof.

According to the present invention, the bonding strength between the protective film and the phosphor layer can be prominently enhanced without deteriorating the quality of the image provided by the obtained radiation image storage panel, by varying the mixing ratio of the binder to the stimulable phosphor in the phosphor layer to have a minimum value within the region of depth of from 1/5 to 4/5 of the thickness of the phosphor layer, the depth being expressed in terms of relative distance (in the direction of the thickness of the phosphor layer) from the protective film-side surface thereof. Said characteristics are advantageously given in the case that the minimum mixing ratio of the binder to the stimulable phosphor is a value within the range of 50–90% of the mean mixing ratio in the region wherein the depth of the phosphor layer is in the range of 0-1/10 of the thickness thereof from the protective film-side surface. In general, as the bonding strength between the protective film and the phosphor layer in the radiation image storage panel, a peel strength (peel angle: 90°) of not less than 100 g./cm is required in practical use. The present invention can provide a radiation image storage panel having such a high bonding strength therebetween.

Further, as the bonding strength between the support and the phosphor layer in the radiation image storage panel, a peel strength (peel angle: 90°) of not less than 200 g./cm is generally required in practical use. The present invention can provide a radiation image storage panel having such a high bonding strength therebetween. As stated above, it is desired that the bonding strength between the support and the phosphor layer is much higher than that between the protective film and the phosphor layer, so that the mixing ratio of the binder to the stimulable phosphor in the vicinity of the interface between the support and the phosphor layer is preferably larger than the mixing ratio thereof in the vicinity of the interface between the protective film and the phosphor layer.

The radiation image storage panel of the present invention having the preferred characteristics as stated above can be prepared, for instance, in the following manner.

The support material employed in the present invention can be selected from those employable for the ratiogaphic intensifying screens in the conventional radiography or those employable for the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer so as to enhance the bonding strength between the support and the phosphor layer, or to improve the sensitivity of the panel or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in Japanese Patent Provisional Publication No. 58(1983)-200200, the phosphor layer-side surface of the support (or the surface of an adhesive layer, light-reflecting layer, or light-absorbing layer in the case where such layers provided on the phosphor layer) may be provided with protruded and depressed portions for enhancement of the sharpness of radiographic image.

On the support, a phosphor layer, which is a characteristic requisite of the present invention, is formed. The phosphor layer comprises a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–850 nm.

Examples of the stimulable phosphor employable in the radiation image storage panel of the present invention include:

$SrS:Ce,Sm$, $SrS:Eu,Sm$, $ThO_2:Er$, and $La_2O_2S:Eu,Sm$, as described in U.S. Pat. No. 3,859,527;

$ZnS:Cu,Pb$, $BaO.xAl_2O_3:Eu$, in which x is a number satisfying the condition of $0.8 \leqq x \leqq 10$, and $M^{2+}O.xSiO_2:A$, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0<x+y \leqq 0.6$, and $xy \neq 0$, and a is a number satisfying the condition of $10^{-6} \leqq a \leqq 5 \times 10^{-2}$, as described in Japanese Patent Provisional Publication No. 55(1980)-12143;

$LnOX:xA$, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in Japanese Patent Provisional Publication No. 55(1980)-12145;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively, as described in Japanese Patent Provisional Publication No. 55(1980)-160078;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 2 \times 10^{-1}$, respectively, as described in Japanese Patent Provisional Publication No. 57(1982)-23673;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in Japanese Patent Provisional Publication No. 58(1983)-206678;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively, as described in Japanese Patent Provisional Publication No. 59(1984)-27980;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0<y \leqq 0.1$, respectively, as described in Japanese Patent Provisional Publication No. 59(1984)-47289;

$BaFX.xNaX':aEu^{2+}$, in which each of X and X' is at least one halogen selected from the group consisting of Cl, Br and I; and x and a are numbers satisfying the conditions of $0<x \leqq 2$ and $0<a \leqq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leqq 2$, $0<y\leqq 0.2$ and $0<z\leqq 10^{-2}$, respectively, as described in Japanese Patent Provisional Publication No. 59(1984)-56480; and $M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0\leqq a\leqq 2$, $0\leqq b\leqq 10^{-2}$, $0\leqq c\leqq 10^{-2}$ and $a+b+c\geqq 10^{-6}$; and x and y are numbers satisfying the conditions of $0<x\leqq 0.5$ and $0<y\leqq 0.2$, respectively, as described in Japanese Patent Application No. 57(1982)-184455.

The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. A mixture of two or more kinds of the above-described polymers may be employed for the binder.

The phosphor layer can be formed on the support, for instance, by the following procedure.

In the first place, stimulable phosphor particles and a binder are added to an appropriate solvent, and then they are mixed to prepare a coating dispersion of the phosphor particles homogeneously dispersed in the binder solution. In the present invention, at least two kinds of coating dispersions having different mixing ratios of the binder to the stimulable phosphor from each other are prepared.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The mixing ratio of the binder to the stimulable phosphor in each coating dispersion can be determined according to the characteristics of the aimed radiation image storage panel and the nature of the phosphor employed. Generally, the ratio is within the range of from 1:1 to 1:100 (binder:phosphor, by weight), preferably from 1:8 to 1:50.

The coating dispersion may contain a dispersing agent to improve the dispersability of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersions containing the phosphor particles and the binder in different mixing ratios prepared as described above are simultaneously applied evenly onto the surface of a support to form a combined layer of the coating dispersions. The coating procedure for the formation of the combined layer of two or more coating dispersion can be carried out by a conventional method such as a method using a doctor blade, a roll coater or a knife coater.

From the viewpoint of enhancing the bonding strength between the support and the phosphor layer, it is necessary to conduct the simultaneous coating in such a manner that the coating dispersion having a relatively large mixing ratio of the binder to the phosphor is arranged on the support-side.

After applying the coating dispersions onto the support, the coating dispersions are then heated slowly to dryness so as to complete the formation of a phosphor layer. Thus, there is prepared a phosphor layer in which the mixing ratio of the binder to the phosphor in the middle region is smaller than the mixing ratios in the vicinity of both surfaces thereof.

In the phosphor layer for the radiation image storage panel according to the present invention formed as described above, the mixing ratio of the binder to the phosphor varies in the direction of the depth of phosphor layer, for instance, as shown in FIG. 1.

FIG. 1 illustrates a graph in which the relative depth of the phosphor layer is plotted as the abscissa and the mixing ratio of the binder to the phosphor (binder/phosphor, by weight) as the ordinate. In FIG. 1, the relative depth of the phosphor layer is expressed by the proportion of the depth from the free surface (i.e., the uppor surface of the coating layer) to the whole thickness thereof, and the value 0 on the abscissa indicates the level of the free surface of the phosphor layer to be provided with a protective film and the value 1 indicates the level of the interface between said layers and the support. The increase of the value on the ordinate indicates increase of the relative amount of the binder to the phosphor.

Curve (I) in FIG. 1 shows a variation of the mixing ratio along the depth of the phosphor layer (i.e., the layer of coating dispersions) immediately after the simultaneous coating with two kinds of coating dispersions having the mixing ratios different from each other. The coating dispersions were prepared by using a divalent europium activated barium fluorobromide phosphor, a mixture of linear polyester resin and nitrocellulose (binder) and methyl ethyl ketone (solvent), in which the coating dispersions A and B had the mixing ratios of 1:10 and 1:40 (binder:phosphor, by weight), respectively. The so-prepared coating dispersions A and B were simultaneously applied onto the support in such a manner that the ratio of flow amount therebetween was 1:3 by volume and the coating dispersion A was arranged to flow on the support-side.

Curve (II) in FIG. 1 shows a variation of the mixing ratio in the phosphor layer according to the invention, which was formed by heating to dryness the layer of coating dispersions having the variation of the mixing ratio as shown in Curve (I). As is apparent from Curves (I) and (II), the mixing ratio of the binder to the phosphor remarkably varied along the depth of the phosphor layer upon drying the coated dispersions. Also apparent from Curve (II) is that the resulting phosphor layer had a larger mixing ratio on the sides of both surfaces thereof and a minimum mixing ratio at the middle portion of the phosphor layer.

The reason why the mixing ratio of the binder to the phosphor varies along the depth of the obtained phosphor layer as directed above is not theoretically clear, but it is assumed that the following phenomenon may take place.

In the case that the above-mentioned two kinds of coating dispersions are simultaneously applied onto the support to form layers of the coating dispersions, the solvent of the coating dispersions is vaporized only from the upper surface (free surface) of said layers to dryness. During the drying procedure, in the upper layer of the coating dispersion wherein the mixing ratio is relatively small, a portion of the binder moves towards the upper surface together with the solvent, so that the binder becomes located in a larger amount in a position being nearer to the upper surface, and on the contrary the phosphor becomes located in a larger amount in a positon being nearer to the lower layer. In the vicinity of the interface between both upper and lower layers having the mixing ratios different from each other, the binders of both layers join together and subsequently the binders move across the interface simultaneously with the movement of the solvent. The content of the binder in the lower layer is larger than that in the upper layer, that is, the solvent is contained in a larger amount per unit volume in the lower layer than in the upper layer, if the viscosity of both coating dispersions are adjusted to the same level. Accordingly, an extremely large amount of the binder moves from the lower to the upper layer along with the movement of the solvent. As a result, the obtained phosphor layer has a larger mixing ratio in a portion being nearer to the both surfaces thereof and a minimum mixing ratio in the middle portion thereof.

The assumption based on the above-described phenomenon is possibly endorsed by the result of study to the effect that a phosphor layer having such a variation of the mixing ratio as mentioned above is never formed in the case that the drying of the layers of coating dispersions is conducted in a sealed state in which the surface of the upper layer is not a free surface, that is, in the case that the free evaporation of the solvent from the surface of the uppor layer is prohibited.

The mixing ratio of the binder to the phosphor along the depth of the phosphor layer broadly varies depending on the mixing ratio and viscosity of each coating dispersion in the preparation thereof, the kinds of solvent and binder, and the coating and drying conditions. There can be obtained a phosphor layer having the desired composition by appropriately controlling these factors.

In the present invention, the mixing ratio of the binder to the phosphor is adjusted to have a minimum value within the region wherein the depth of the phosphor layer from the protective film-side surface is in the range of 1/5–4/5 of the thickness thereof. From the viewpoint of enhancement of the bonding strength and the image quality, the minimum value of the mixing ratio preferably ranges from 50 to 90% of the mean mixing ratio in the vicinity of the protective film-side surface (the surface of the phosphor layer not facing the support).

Furthermore, from the viewpoint of the bonding strength required in practical use, the mixing ratio of the binder to the phosphor in the vicinity of the support-side surface is preferably larger than that in vicinity of the protective film-side surface.

The thickness of the phosphor layer varies depending upon the characteristics of the aimed radiation image storage panel, the nature of the phosphor, the mixing ratio of the binder to the phosphor, etc. In general, the thickness is within a range of from 50 $\mu$m to 1 mm.

From the viewpoint of the image quality, the flow amount of the coating dispersion having a relatively large mixing ratio of the binder to the phosphor, which is applied onto the support-side (and/or the protective film-side), is preferably smaller than that of the other coating dispersion.

In the formation of the phosphor layer, the coating dispersions having various mixing ratios of the binder to the phosphor are by no means restricted to two kinds, and three or more of coating dispersions can be involved in the preparation of the phosphor layer of the panel of the present invention. In the case of employing three or more of coating dispersions, it is necessary to perform the coating procedure in such a manner that a layer of coating dispersion having the relatively small mixing ratio is arranged inside of the resulting phosphor layer.

The phosphor layer can be provided onto the support by the methods other than that given in the above. For instance, the phosphor layer is initially prepared on a sheet material (false support) such as a glass plate, a metal plate or a plastic sheet using the aforementioned coating dispersions and then thus prepared phosphor layer is superposed on the genuine support by pressing or using an adhesive agent.

Further, the formation of the phosphor layer can be carried out by the methods other than the above-described procedure of simultaneous coating the support or the like with a plurality of coating dispersions. For instance, one coating dispersion may be applied onto the support and subsequently another coating dispersion is applied thereonto prior to drying the previously applied coating dispersion (namely, successive coating).

On the surface of the so-formed phosphor layer (the surface opposite to the support-side), a transparent protective film is provided to protect the phosphor layer from physical and chemical deterioration.

The transparent protective film can be provided onto the phosphor layer by coating the surface thereof with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl actate copolymer), and drying the coated solution. Alternatively, the transparent protective film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approx. 3 to 20 μm.

The following examples further illustrate the present invention, but these examples are by no means understood to restrict the invention. In the following examples, the term of "part" means "part by weight", unless otherwise stated.

EXAMPLE 1

To a mixture of a particulate divalent europium activated barium fluorobromide stimulable phosphor ($BaFBr:Eu^{2+}$) and a linear polyester resin were successively added methyl ethyl ketone and nitrocellulose (nitrification degree: 11.5%) to prepare a dispersion containing phosphor particles. To the dispersion were subsequently added tricresyl phosphate, n-buthanol and methyl ethyl ketone, and the mixture was sufficiently stirred by means of a propeller agitater to prepare a homogeneous coating dispersion A having a mixing ratio of 1:10 (binder:phosphor, by weight) and a viscosity of 30 PS (at 25° C.), in which the ratio of linear polyester resin to nitrocellulose is 9:1, by weight.

The same materials were employed in the same manner as described above to prepare a coating dispersion B having a mixing ratio of 1:40 (binder:phosphor, by weight) and viscosity of 30 PS (at 25° C.), in which the ratio of linear polyester resin to nitrocellulose is the same as in dispersion A.

Then, the coating dispersions A and B were evenly and simultaneously applied onto a polyethylene terephthalate film containing carbon black (support, thickness: 250 μm) placed horizontally on a glass plate so as that the ratio of flow amount between the coating dispersions A and B was 1:3 (by volume) and the coating dispersion A was arranged on the support-side. The application of the coating dispersions was carried out using a doctor blade. After the coating was complete, the support having layers of the coating dispersions was heated to dryness under air stream at 100° C. and at a flow rate of 1.0 m/sec. Thus, a phosphor layer was formed on the support.

On the phosphor layer was placed a transparent polyethylene terephthalate film (thickness: 12 μm; provided with a polyester adhesive layer on one surface) to combine the film and the phosphor layer with the adhesive layer. Thus, a radiation image storage panel consisting essentially of a support, a phosphor layer and a transparent protective film was prepared.

COMPARISON EXAMPLE 1

The radiation image storage panel consisting essentially of a support, a phosphor layer and a transparent protective film was prepared in the same manner as described in Example 1, except that only the coating dispersion A having the mixing ratio of 1:10 (binder:-phosphor, by weight) was employed.

COMPARISON EXAMPLE 2

The radiation image storage panel consisting essentially of a support, a phosphor layer and a transparent protective film was prepared in the same manner as described in Example 1, except that only the coating dispersion A having the mixing ratio of 1:10 (binder:-phosphor, by weight) was employed and the coating dispersion A was applied onto the transparent polyethylene terephthalate film (protective film, thickness: 12 μm) placed horizontally on a glass plate, followed by drying to form a phosphor layer, and that the support was further provided on the phosphor layer through an adhesive layer.

COMPARISON EXAMPLE 3

The radiation image storage panel consisting essentially of a support, a phosphor layer and a transparent protective film was prepared in the same manner as described in Example 1, except that only the coating dispersion A having the mixing ratio of 1:10 (binder:-phosphor, by weight) was employed to form a layer of the coating dispersion on the support, and the support having said layer was heated to dryness at 30° C. for 120 min. (under air stream at a flow rate of nearly 0 m/sec.), and further under air stream at 100° C. for 30 min. and at a flow rate of 1.0 m/sec.

COMPARISON EXAMPLE 4

The procedure of Example 1 was repeated except that the mixing ratio was set to 1:20 (binder:phosphor, by weight), to prepare a coating dispersion C.

Then, the radiation image storage panel consisting essentially of a support, a phosphor layer and a transparent protective film was prepared in the same manner as described in Comparison Example 1, except that the coating dispersion C was employed.

COMPARISON EXAMPLE 5

The radiation image storage panel consisting essentially of a support, a phosphor layer and a transparent protective film was prepared in the same manner as described in Comparison Example 2, except that the coating dispersion A was replaced with the coating dispersion C prepared in Comparison Example 4 having the mixing ratio of 1:20 (binder:phosphor, by weight).

COMPARISON EXAMPLE 6

The radiation image storage panel consisting essentially of a support, a phosphor layer and a transparent protective film was prepared in the same manner as described in Comparison Example 3, except that the coating dispersion A was replaced with the coating dispersion C prepared in Comparison Example 4 having the mixing ratio of 1:20 (binder:phosphor, by weight).

COMPARISON EXAMPLE 7

The radiation image storage panel consisting essentially of a support, a phosphor layer and a transparent protective film was prepared in the same manner as described in Example 1, except that only the coating dispersion B having the mixing ratio of 1:40 (binder:-phosphor, by weight) was employed.

COMPARISON EXAMPLE 8

The radiation image storage panel consisting essentially of a support, a phosphor layer and a transparent protective film was prepared in the same manner as described in Comparison Example 2, except that the coating dispersion A was replaced with the coating dispersion B having the mixing ratio of 1:40 (binder:-phosphor, by weight).

COMPARISON EXAMPLE 9

The radiation image storage panel consisting essentially of a support, a phosphor layer and a transparent protective film was prepared in the same manner as described in Comparison Example 3, except that the coating dispersion A was replaced with the coating dispersion B having the mixing ratio of 1:40 (binder:-phosphor, by weight).

In the preparation of the above-described radiation image storage panels, the thickness of each phosphor layer was adjusted in such a manner that each panel had the same sensitivity.

Each of the radiation image storage panels was measured to determine the mixing ratio of the binder to the phosphor along the depth of the phosphor layer by an X-ray micro-analyzer. The results are set forth in FIG. 2.

Figure 2:
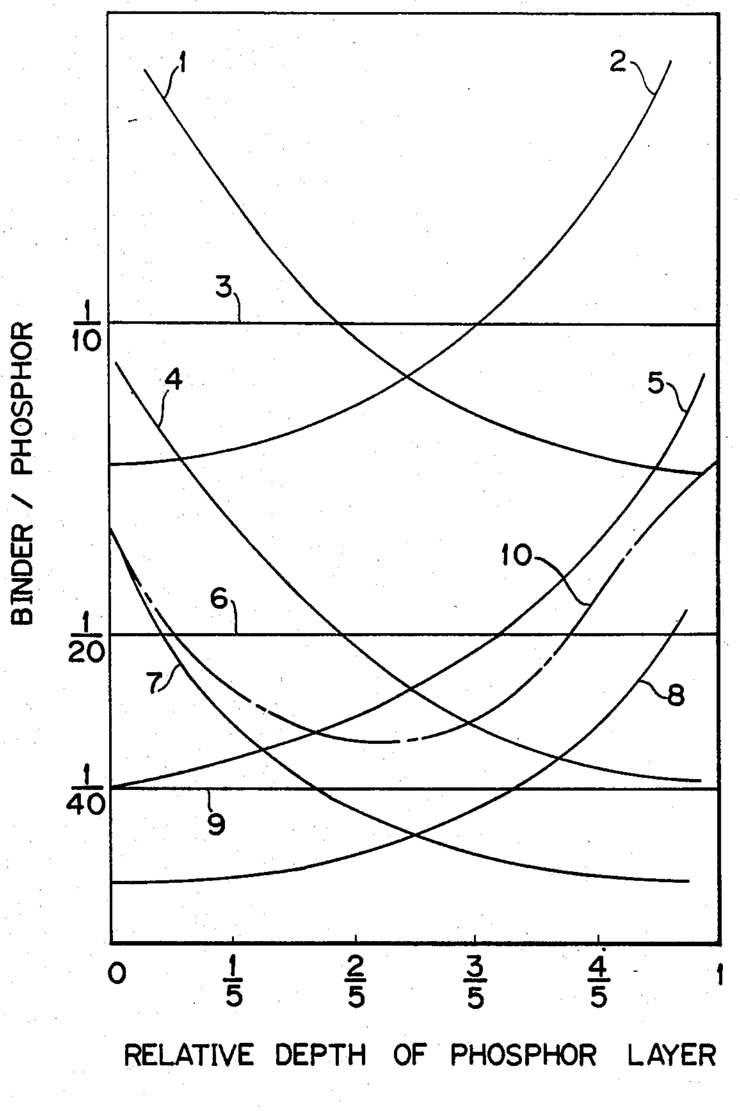
FIG. 2 shows relationships between the relative depth of the phosphor layer from the protective film-side surface and the mixing ratio of the binder to the phosphor (binder/phosphor) in the radiation image storage panel according to the present invention (Curve 10), and in a variety of radiation image storage panels having different mixing ratios for comparison (Curves 1–9).

FIG. 2 illustrates graphs in which the relative depth of the phosphor layer from the protective film-side surfac is plotted on the abscissa and the mixing ratio of binder/phosphor (by weight) as the ordinate, in which Graph 10 shows the radiation image storage panel of Example 1 and Graphs 1-9 show the radiation image storage panels of Comparison Examples 1 through 9, respectively.

As is evident from the results shown in FIG. 2, the radiation image storage panel according to the present invention (Example 1) had a minimum mixing ratio of the binder to the phosphor at the relative depth of approx. 2/5 of the thickness of the phosphor layer from the protective film-side surface, and its value was approx. 50% of the mixing ratio in the vicinity of the interface between the protective film and the phosphor layer. It is also evident that the mixing ratio in the vicinity of the interface between the phosphor layer and the support was larger than that in the vicinity of the interface between the phosphor layer and the protective film.

On the other hand, the radiation image storage panels of Comparison Examples 1, 4 and 7 had a minimum mixing ratio of the binder to the phosphor in the vicinity of the interface between the support and the phosphor layer, that is, the binder was located in a larger amount on the protective film-side portion and the phosphor presented in a larger amount on the support-side portion. On the contrary, the radiation image storage panels of Comparison Examples 2, 5 and 8 had a minimum mixing ratio in the vicinity of the interface between the protective film and the phosphor layer, that is, the phosphor was located in a larger amount on the protective film-side portion and the binder was located in a larger amount on the support-side portion. In the radiation image storage panels of Comparison Examples 3, 6 and 9, the mixing ratios were fixed at the same values along the depth of the phosphor layer and the phosphor dispersed homogeneously.

The radiation image storage panels prepared as described above were evaluated on the sharpness of the image provided thereby, and the bonding strength between the phosphor layer and the support as well as that between the phosphor layer and the support, according to the following tests.

(1) Sharpness of image

The radiation image storage panel was exposed to X-rays at voltage of 80 KVp through an MTF chart and subsequently scanned with a He-Ne laser beam (wavelength: 632.8 nm) to excite the phosphor particles contained in the panel. The light emitted by the phosphor layer of the panel was detected and converted to electric signals by means of a photosensor (a photomultiplier having spectral sensitivity of type S-5). The radiation image of MTF chart was reproduced from the electric signals by an image reproducing apparatus to obtain a visible image on a displaying apparatus, and the modulation transfer function (MTF) value of the visible image was determined. The MTF value was given as a value (%) at the spacial frequency of 2 cycle/mm. As described hereinbefore, the sharpness of image was measured under the condition of same sensitivity of the panels.

(2) Bonding Strength between phosphor layer and support

The radiation image storage panel was cut to give a test strip having a width of 10 mm and the test strip was given with a notch on the interface between the phosphor layer and the support. In a tensile testing machine (Tensilon UTM-II-20 manufactured by Toyo Baldwin Co., Ltd., Japan), the support part and the part of the phosphor layer and protective film of the so notched test strip were forced to separate from each other by pulling both parts relatively along the rectangular direction (peel angle: 90°) at a tensile rate of 10 mm/min. The bonding strength was determined just when a portion of the phosphor layer in the length of 10-mm was separated from the support. The strength (peel strength) is expressed in terms of the force F (g./cm).

(3) Bonding Strength between phosphor layer and protective film

The radiation image storage panel was cut to give a test strip having a width of 10 mm and the test strip was given with a notch on the interface between the phosphor layer and the protective film. The bonding strength between the phosphor layer and the protective film was then determined in the same manner as described above except that the part of the protective film and the part of the phosphor layer and support of the so notched test strip were forced to separate from each other by pulling both parts relatively.

The results of the evaluation on the radiation image storage panels are set forth in Table 1.

TABLE 1

| | B:P (by weight) | Sharpness (%) | Bonding Strength (g./cm) Support | Protective film |
|---|---|---|---|---|
| Ex. 1 | (1:10, 1:40) | 32 | 300 | 150 |
| Com. Ex. 1 | 1:10 | 27 | 150 | 400 |
| Com. Ex. 2 | 1:10 | 28 | 350 | 150 |
| Com. Ex. 3 | 1:10 | 28 | 280 | 210 |
| Com. Ex. 4 | 1:20 | 31 | 50 | 160 |
| Com. Ex. 5 | 1:20 | 32 | 140 | 60 |
| Com. Ex. 6 | 1:20 | 31 | 80 | 130 |
| Com. Ex. 7 | 1:40 | 34 | 20 | 120 |
| Com. Ex. 8 | 1:40 | 35 | 100 | 20 |
| Com. Ex. 9 | 1:40 | 35 | 30 | 40 |

Remarks: B:P means a mixing ratio by weight of the binder to the stimulable phosphor in the coating dispersions.

As is evident from the results set forth in Table 1, the radiation image storage panel according to the present invention (Example 1) was enhanced in the bonding strength between the support and the phosphor layer and between the protective film and the phosphor layer, as well as in the sharpness of image. Further, the panel according to the present invention was balanced on the bonding strength therebetween and the sharpness of image, as compared with the radiation image storage panels for comparison (Comparison Examples 1 through 9).

We claim:

1. A radiation image storage panel comprising a support, a phosphor layer provided on the support which comprises a binder and a stimulable phosphor dispersed therein, and a protective film provided on the phosphor layer, characterized in that a mixing ratio of the binder to the stimulable phosphor in said phosphor layer so varies as to show a minimum value within a region of depth of from 1/5 to 4/5 of the thickness of the phosphor layer, the depth being expressed in terms of relative distance from the protective film-side surface.

2. The radiation image storage panel as claimed in claim 1, in which said minimum value of the mixing ratio of the binder to the stimulable phosphor in the phosphor layer is within the range of from 50 to 90% of the mean mixing ratio in a region of depth of from 0 to 1/10 of the thickness of the phosphor layer, the depth being expressed in terms of relative distance from the protective film-side surface.

3. The radiation image storage panel as claimed in claim 1, in which the mean mixing ratio of the binder to the stimulable phosphor in a region of depth of from 0 to 1/10 of the thickness of the phosphor layer, said depth being expressed in terms of relative distance from the support-side surface, is larger than the mean mixing ratio in the region of depth of from 0 to 1/10 of the same, said depth being expressed in terms of relative distance from the protective film-side surface.

4. The radiation image storage panel as claimed in any one of claims 1 through 3, in which the thickness of said phosphor layer is within the range of from 50 μm to 1 mm.

5. The radiation image storage panel as claimed in any one of claims 1 through 3, in which said minimum value of the mixing ratio of the binder to the stimulable phosphor in the phosphor layer is within the range of from 1:5 to 1:100, by weight.

6. The radiation image storage panel as claimed in claim 5, in which said minimum value of the mixing ratio of the binder to the stimulable phosphor in the phosphor layer is within the range of from 1:10 to 1:50, by weight.

* * * * *